(12) United States Patent
Rowe

(10) Patent No.: US 8,984,600 B2
(45) Date of Patent: Mar. 17, 2015

(54) INTEGRATING A ROUTER BASED WEB METER AND A SOFTWARE BASED WEB METER

(71) Applicant: Google Inc., Mountain View, CA (US)

(72) Inventor: Simon Michael Rowe, Finchampstead (GB)

(73) Assignee: Google Inc., Mountain View, CA (US)

( * ) Notice: Subject to any disclaimer, the term of this patent is extended or adjusted under 35 U.S.C. 154(b) by 58 days.

(21) Appl. No.: 13/660,742

(22) Filed: Oct. 25, 2012

(65) Prior Publication Data

US 2014/0123252 A1 May 1, 2014

(51) Int. Cl.
G06F 21/00 (2013.01)
H04L 29/06 (2006.01)
G06F 21/60 (2013.01)
G06F 21/31 (2013.01)
G06F 21/50 (2013.01)
G06F 21/73 (2013.01)

(52) U.S. Cl.
CPC ............ *H04L 63/102* (2013.01); *G06F 21/604* (2013.01); *G06F 21/31* (2013.01); *G06F 21/50* (2013.01); *G06F 21/73* (2013.01); *H04L 63/0876* (2013.01); *H04L 63/0884* (2013.01)
USPC .................. 726/6; 726/21; 709/219; 709/224

(58) Field of Classification Search
CPC ....... G06F 21/31; G06F 21/50; G06F 21/604; G06F 21/606; G06F 21/60; G06F 21/73
USPC .............................. 709/224, 219; 726/5, 21, 6
See application file for complete search history.

(56) References Cited

U.S. PATENT DOCUMENTS

2006/0242294 A1* 10/2006 Damick et al. ................ 709/224
2012/0221716 A1 8/2012 Halevi et al.

FOREIGN PATENT DOCUMENTS

WO WO 2006/090284 A1 8/2006

OTHER PUBLICATIONS

Tront, Joseph, et al.; "Security and privacy produced by DHCP unique identifiers";Nano, Information Technology and Reliability (NASNIT), 2011 15th North-East Asia Symposium on DOI: 10.1109/NASNIT.2011.6111142 Publication Year: 2011 , pp. 170-179.*

(Continued)

*Primary Examiner* — Harunur Rashid
*Assistant Examiner* — Angela Holmes
(74) *Attorney, Agent, or Firm* — Morgan, Lewis & Bockius LLP

(57) ABSTRACT

A method for associating a web event with a member of a group of users is implemented at a first computing device. The method includes: receiving a data access request from a second computing device; determining whether the user has previously provided personal information and authorization to the first computing device through the second computing device; if the user's personal information and authorization are found: generating a record for the data access request; if the user's personal information is found but the user's authorization is not found: generating a record for the data access request; and if neither of the user's personal information and authorization is found: identifying one or more user identifiers that are associated with the second computing device; and returning personal information associated with the one or more user identifiers to the second computing device.

20 Claims, 9 Drawing Sheets

(56) References Cited

OTHER PUBLICATIONS

Laferriere, C.;et al.; "Authentication and authorization techniques in distributed systems";Security Technology, 1993. Security Technology, Proceedings. Institute of Electrical and Electronics Engineers 1993 International Carnahan Conference on DOI: 10.1109/CCST.1993.386805 Publication Year: 1993 , pp. 164-170.*

Google Inc., International Search Report and Written Opinion, PCT/US2013/066235, Feb. 21, 2014, 8 pgs.

* cited by examiner

200 ## INTEGRATING A ROUTER BASED WEB METER AND A SOFTWARE BASED WEB METER

TECHNICAL FIELD

The disclosed implementations relate generally to tracking web browsing activities from a household, and in particular, to system and method for associating the web browsing activities with the individual household members.

BACKGROUND

People spend time on the Internet at home for different purposes, such as checking news and other information, doing on-line shopping, exchanging information via email or social networking websites, watching or listening video and/or audio clips, etc. Meanwhile, users in an average household can usually access the Internet through multiple computing devices, such as PC, smartphone, tablet, game console, smart TV, TV set top box, etc. Although it is possible to keep track of all the web browsing activities (also known as web events) originated from a particular household, it is difficult to associate a particular web event (e.g., a visit to a particular website) with a particular member of the household in a less intrusive manner, which is especially true if the household includes multiple household members that may use different devices accessing the Internet at the same time.

SUMMARY

In accordance with some implementations described below, a computer-implemented method for associating a web event with a particular member of a group of users is implemented at a first computing device having one or more processors and memory. The computer-implemented method includes: receiving a data access request from a second computing device, wherein the data access request is generated by a user of the second computing device for accessing data service at a remote server; determining whether the user has previously provided personal information and authorization to the first computing device through the second computing device; if the user's personal information and authorization are found: generating a record for the data access request, wherein the record includes the user's personal information and an identifier of the data access request; if the user's personal information is found but the user's authorization is not found: generating a record for the data access request, wherein the record includes an identifier of the data access request and an identifier of the second computing device; and if neither of the user's personal information and authorization is found: identifying one or more user identifiers that are associated with the second computing device; and returning personal information associated with the one or more user identifiers to the second computing device, wherein the personal information associated with the one or more user identifiers is to be displayed on the second computing device so that the user of the second computing device can choose personal information associated with one of the one or more user identifiers.

In accordance with some implementations described below, a first computing device for associating a web event with a particular member of a group of users is disclosed, the first computing device including one or more processors and memory storing one or more programs to be executed by the one or more processors. The one or more programs include instructions for: receiving a data access request from a second computing device, wherein the data access request is generated by a user of the second computing device for accessing data service at a remote server; determining whether the user has previously provided personal information and authorization to the first computing device through the second computing device; if the user's personal information and authorization are found: generating a record for the data access request, wherein the record includes the user's personal information and an identifier of the data access request; if the user's personal information is found but the user's authorization is not found: generating a record for the data access request, wherein the record includes an identifier of the data access request and an identifier of the second computing device; and if neither of the user's personal information and authorization is found: identifying one or more user identifiers that are associated with the second computing device; and returning personal information associated with the one or more user identifiers to the second computing device, wherein the personal information associated with the one or more user identifiers is to be displayed on the second computing device so that the user of the second computing device can choose personal information associated with one of the one or more user identifiers.

In accordance with some implementations described below, a non-transitory computer readable-storage medium storing one or more programs to be performed by a first computing device for associating a web event with a particular member of a group of users is disclosed. The one or more programs include instructions for: receiving a data access request from a second computing device, wherein the data access request is generated by a user of the second computing device for accessing data service at a remote server; determining whether the user has previously provided personal information and authorization to the first computing device through the second computing device; if the user's personal information and authorization are found: generating a record for the data access request, wherein the record includes the user's personal information and an identifier of the data access request; if the user's personal information is found but the user's authorization is not found: generating a record for the data access request, wherein the record includes an identifier of the data access request and an identifier of the second computing device; and if neither of the user's personal information and authorization is found: identifying one or more user identifiers that are associated with the second computing device; and returning personal information associated with the one or more user identifiers to the second computing device, wherein the personal information associated with the one or more user identifiers is to be displayed on the second computing device so that the user of the second computing device can choose personal information associated with one of the one or more user identifiers.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
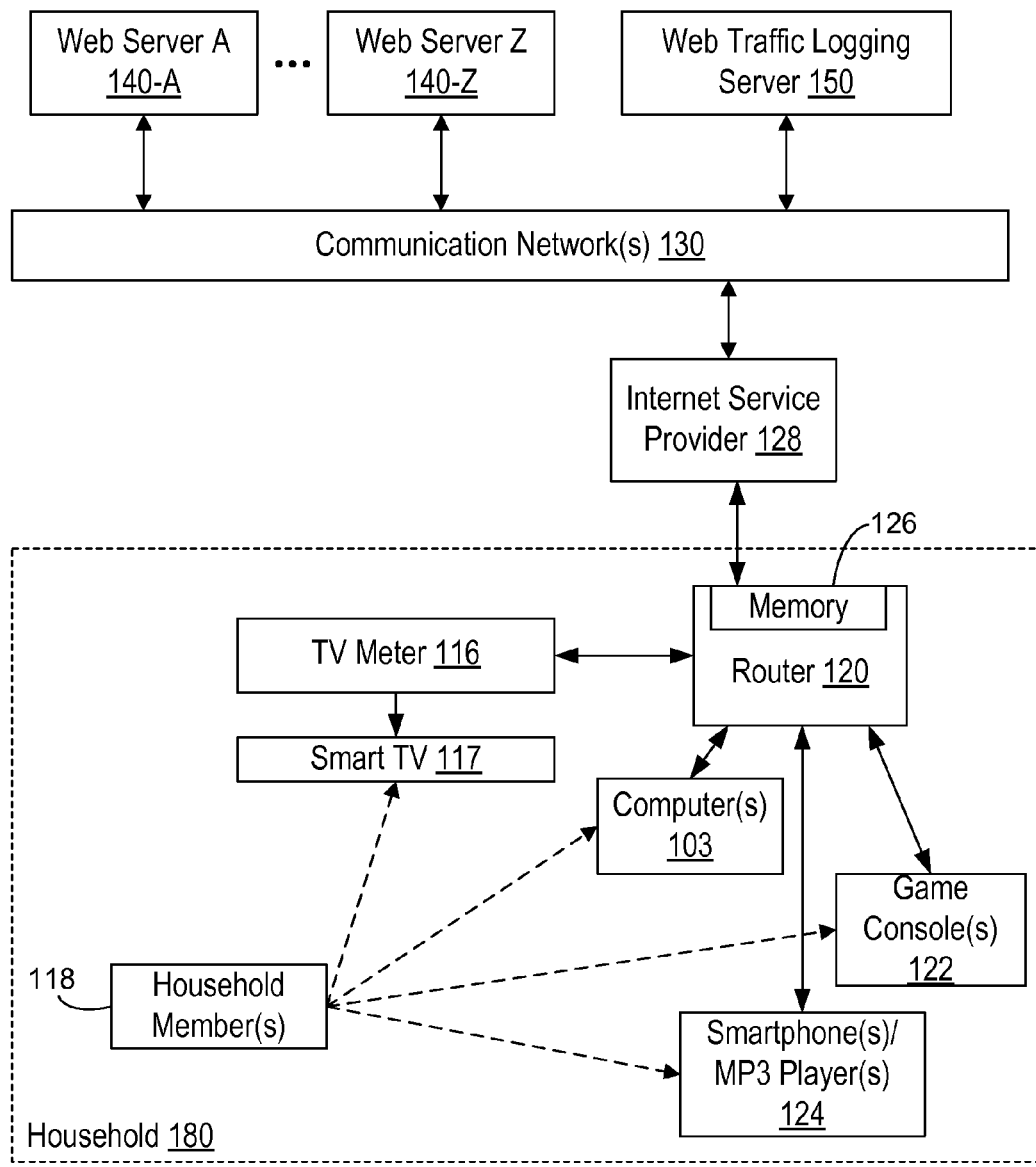
FIG. 1 is a block diagram illustrating a client-server computer network including a plurality of computing devices at a household that communicate with a plurality of web servers on the Internet, the computer network including a router at the household and a remote web traffic logging server that are responsible for associating a web event from the household with a particular member of the household in accordance with some implementations.

FIG. 1 is a block diagram illustrating a client-server computer network including a plurality of computing devices at a household that communicate with a plurality of web servers on the Internet, the computer network including a router at the household and a remote web traffic logging server that are responsible for associating a web event from the household with a particular member of the household in accordance with some implementations. In this example, the computing devices in the household 180 include one or more computers 103 (e.g., desktop, laptop, tablet, etc.), game consoles 122, smartphones or MP3 players 124, smart TV 117, and TV meter 116 (e.g., a set top box). In some implementations, the smart TV 117 and the TV meter 116 may be merged together as one device. As shown in the figure, data access requests from these computing devices are sent to the respective web servers 140 though a router 120 in the household, the Internet service provider 128, and communication networks 130.

As noted above, the relationship between different household members 118 and the computing devices in the household is many-to-many. In other words, one household member may send a search query to an on-line shopping website from a computer 103 while another household member may visit a social networking website from the smart TV 117 at the same time. Similarly, the same household member may be using the game console 122 to play an on-line game at one moment and sending an electronic message to a friend from his or her smartphone 124. Although these web events may be all captured by the router 120, the many-to-many relationship between the household members and the computing devices makes it difficult to determine which household member is behind a particular data access request. In some implementations, it is of interest to track the web events associated with individual members of a household who are sharing a single Internet connection and router. For example, this is the case when multiple household members are participants in a panel that measures their web activity, both individually and/or as a household. In some implementations, a household member who is a panel participant is often required to first log into his or her account from a computing device that he or she is going to use to browse the Internet. Terms of use between the household and/or the individual members and an agency that is interested in collecting data associated with the household's web activities (e.g., an organization that operates the web traffic logging server 150) may provide that no individual-level data will be collected for a web session unless that particular individual has logged into collection software or his or her account with the agency or otherwise consented to collection of information prior to that web session. In other words, terms of use the agency needs to get a prior approval from the household members before collecting any data from the household or using their data for any other purpose. In some implementations, the agreement specifies a protocol that the household members need to follow to make sure that the data collected from the household is not only legitimate but also meaningful so that a third-party data analyst (e.g., a sales person from an advertising company) can derive useful results from the data. For example, before starting browsing the Internet, a household member (also known as a panelist) needs to log into his or her account to specify whether the subsequent web browsing activities should be logged or not.

In some implementations, when a household agrees to have its web browsing activities logged, the household provides demographic information for each household member and generates an account for each household member at the web traffic logging server 150 using the demographic information. In addition, the household may also provide a list of computing devices that the household members use to browse the Internet. Such information is stored at the household member at the web traffic logging server 150 and maybe the router 120. Whenever the household purchases a new computing device or stops using an existing computing device, it should update the household's associated device information accordingly. Note that the computing devices with Internet accessibility in a household can generally be divided into two distinct groups. A first group of computing devices such as the computer 103 and the smartphone 124 usually have more generic and/or accessible user interfaces and operating systems such that it is relatively easy for a third-party developer to develop an application for different household members to log into his or her account and provide instructions to the router 120 and the web traffic logging server 150. A second group of computing devices such as the smart TV 117 and the game console 122 run on a more proprietary operating system that makes it more difficult for supporting a third-party application (e.g., an application for panelist registration). In order to capture the web browsing activities originating from both groups of computing devices, multiple approaches are described herein, each involving collaboration between one or more computing devices within a household, a specially-programmed router 120 and a web traffic logging server 150.

Figure 2:
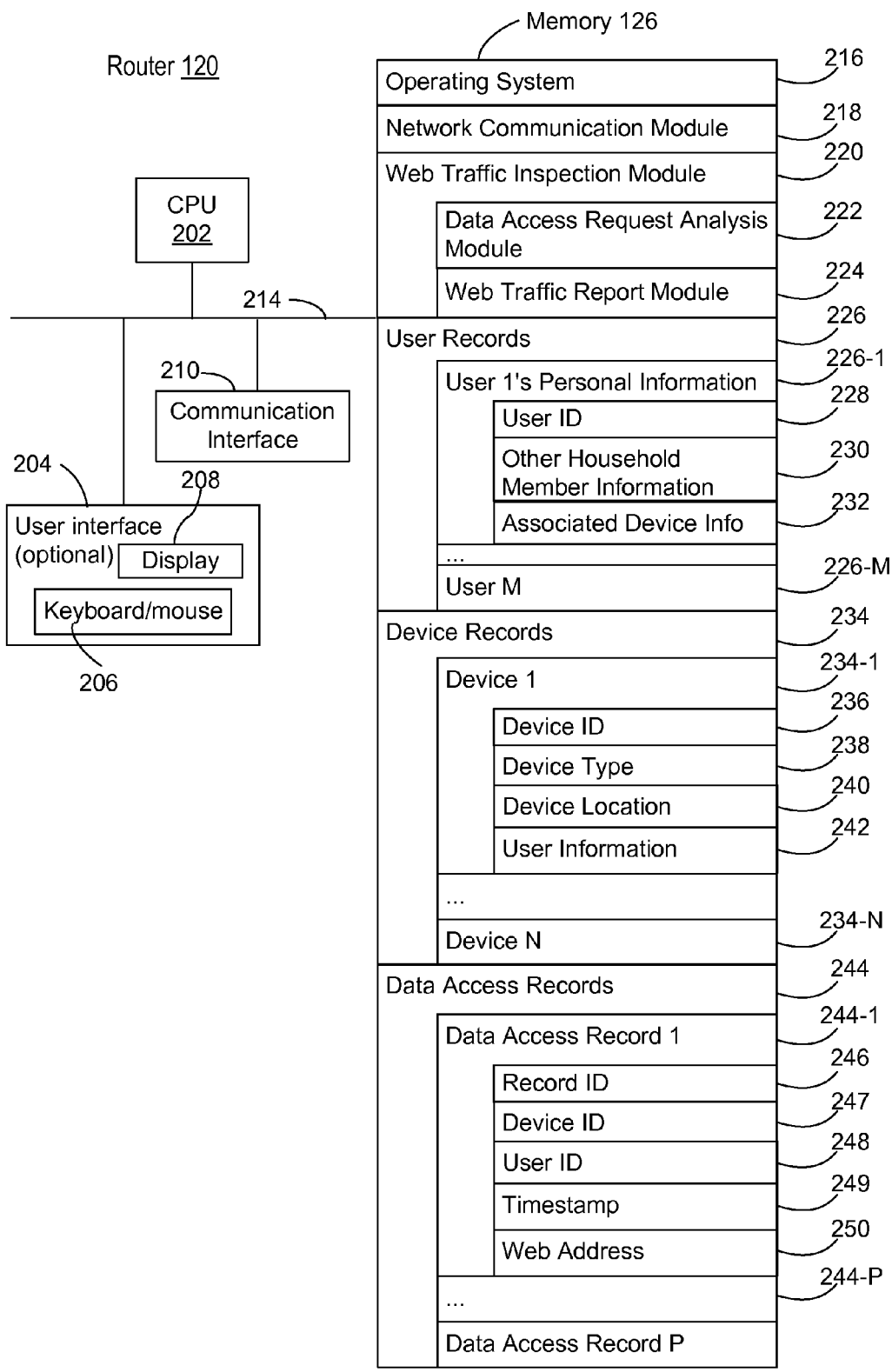
FIG. 2 is a block diagram illustrating the components of the router for processing data access requests from different household members using different computing devices within the household in accordance with some implementations.

FIG. 2 is a block diagram illustrating components of the router 120 for processing data access requests from different household members using different computing devices within the household in accordance with some implementations. The router 120 includes one or more processing units (CPU's) 202 for executing modules, programs and/or instructions stored in memory 126 and thereby performing processing operations; one or more network or other communications interfaces 110; memory 126; and one or more communication buses 214 for interconnecting these components. In some implementations, the router 120 includes a user interface 304 comprising a display device 208 and one or more input devices 206 (e.g., keyboard or mouse). In some other implementations, the router 120 shares the input/output accessories with another computing device. For example, a household member can configure the router 120 from a computer 103 that is connected to the router 120, wired or wireless, using, e.g., a web browser window or a dedicated application.

In some implementations, the memory 126 includes high-speed random access memory, such as DRAM, SRAM, DDR RAM or other random access solid state memory devices. In some implementations, memory 126 includes non-volatile memory, such as one or more magnetic disk storage devices, optical disk storage devices, flash memory devices, or other non-volatile solid state storage devices. In some implementations, memory 126 includes one or more storage devices remotely located from the CPU(s) 202. Memory 126, or alternately the non-volatile memory device(s) within memory 126, comprises a non-transitory computer readable storage medium. In some implementations, memory 126 or the computer readable storage medium of memory 126 stores the following elements, or a subset of these elements, and may also include additional elements:

- an operating system 216 that includes procedures for handling various basic system services and for performing hardware dependent tasks;
- a network communications module 218 that is used for connecting the router 120 to other computing devices via the communication network interfaces 210 and one or more communication networks (wired or wireless), such as the Internet, other wide area networks, local area networks, metropolitan area networks, and so on;
- a web traffic inspection module 220 for checking the data access requests from different computing devices and the responses to these requests from different web servers, the web traffic inspection module 220 further including a data access request analysis module 222 for extracting information from the data access requests and analyzing the information to determine appropriate actions accordingly and a web traffic report module 224 for reporting the analysis results and the corresponding actions taken by the router 120 to the web traffic logging server 150;
- a plurality of user records 226, each record (226-1, . . . , 226-M) containing a household member's personal information such as a user ID 228, other information 230 regarding the household member, and associated device information 232 (e.g., the identifiers of the computing devices that the household member often uses for browsing the Internet);
- a plurality of computing device records 234, each record (234-1, . . . , 234-N) including a device ID 236 (e.g., an IP address or a MAC address), a device type 238 (e.g., computer, game console, smartphone, smart TV, etc.), a device location 240 (e.g., living room, bedroom, etc.), and user information 242 (e.g., the user IDs of the household members that are likely to use the computing device for Internet browsing; and
- a plurality of data access records 244, each record (244-1, . . . , 244-P) corresponding to a data access request for a web server from a particular computing device in the household, including a record ID 246, a device ID 247, a user ID 248, a timestamp, and a web address 249 (e.g., a URL).

As will be described below, different components within the router 120 work in concert by generating a data access record that associates a respective web browsing activity from a computing device with a particular household member if possible, subject to consent by the particular household member, and then submitting the data access record to the web traffic logging server 150.

Figure 3:
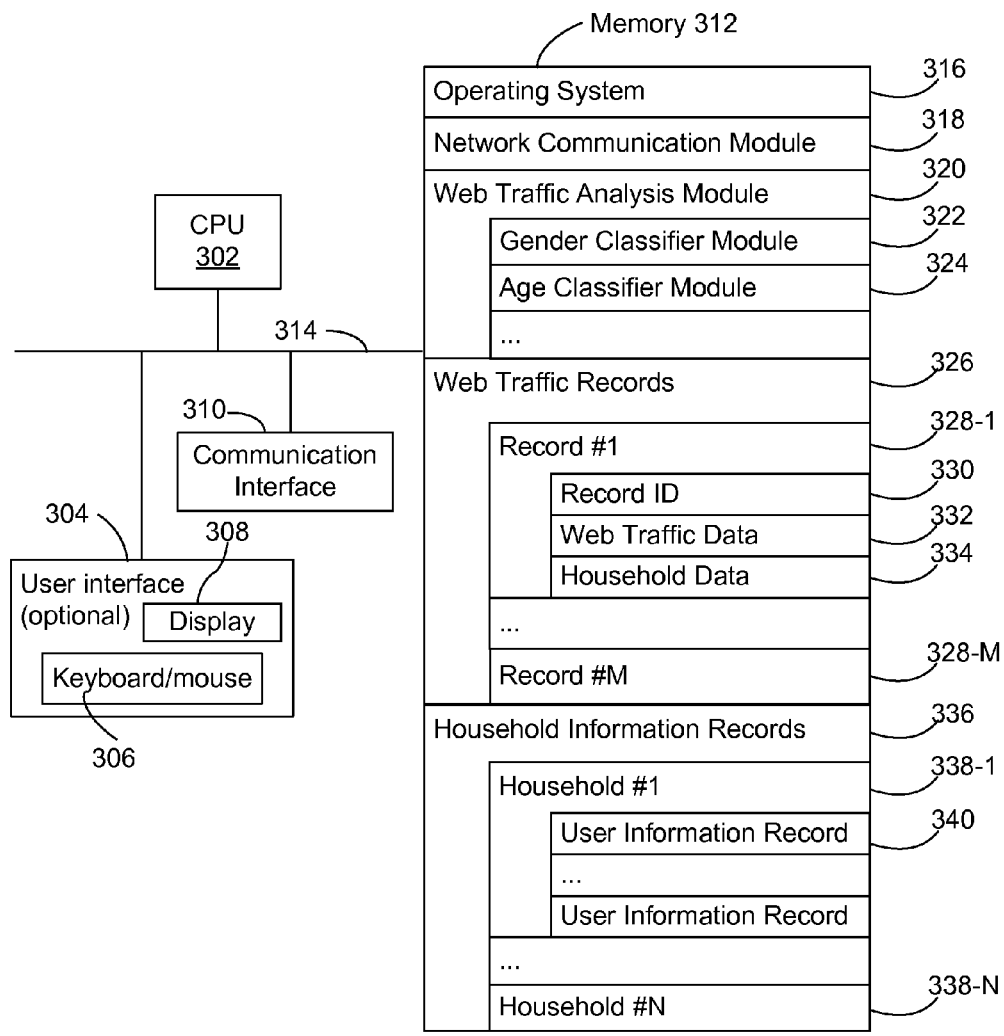
FIG. 3 is a block diagram illustrating the components of the web traffic logging server for collecting and organizing web traffic data from different households in accordance with some implementations.

FIG. 3 is a block diagram illustrating components of the web traffic logging server for collecting and organizing web traffic data from different households in accordance with some implementations. The web traffic logging server 150 includes one or more processing units (CPU's) 302 for executing modules, programs and/or instructions stored in memory 312 and thereby performing processing operations; one or more network or other communications interfaces 310; memory 312; and one or more communication buses 314 for interconnecting these components. In some implementations, the web traffic logging server 150 includes a user interface 304 comprising a display device 308 and one or more input devices 306 (e.g., keyboard or mouse).

In some implementations, the memory 312 includes high-speed random access memory, such as DRAM, SRAM, DDR RAM or other random access solid state memory devices. In some implementations, memory 312 includes non-volatile memory, such as one or more magnetic disk storage devices, optical disk storage devices, flash memory devices, or other non-volatile solid state storage devices. In some implementations, memory 312 includes one or more storage devices remotely located from the CPU(s) 302. Memory 312, or alternately the non-volatile memory device(s) within memory 312, comprises a non-transitory computer readable storage medium. In some implementations, memory 312 or the computer readable storage medium of memory 312 stores the following elements, or a subset of these elements, and may also include additional elements:

- an operating system 316 that includes procedures for handling various basic system services and for performing hardware dependent tasks;
- a network communications module 318 that is used for connecting the web traffic logging server 150 to other computers via the communication network interfaces 310 and one or more communication networks (wired or wireless), such as the Internet, other wide area networks, local area networks, metropolitan area networks, and so on;
- a web traffic analysis module 320 for exploring the web traffic data records collected from a large number of households and deriving statistical information from the records; in some implementations, the web traffic analysis module 320 further including one or more classifiers (e.g., a gender classifier module 322 or an age classifier module 324) to characterize the responsible individuals for those data access records that the routers at different households are unable to associate particular household members for these records;
- a plurality of web traffic records 326, each record (328-1, . . . , 328-M) including a unique record ID 330 and associated web traffic data 332 and household data 334 (e.g., information extracted from the data access records submitted by different routers); and a plurality of household information records 336, each record (338-1, . . . , 338-N) including information collected from a particular household such as a user information record 340 for each household member.

As shown in FIG. 1, the computing devices shown in the figure communicate with the web servers 140 through the router 120. In other words, each data access request from any of these computing devices goes through the router 120 before reaching its destination, which gives the router 120 a unique opportunity to check whether this request is uniquely associated with a particular household member using a particular computing device. If so, the router 120 can generate a data access record accordingly. Otherwise, the router 120 can leverage the other information it has to lower the chance of reporting a data access request to the web traffic logging server 150 without being able to identify who is responsible for the request. Below are three approaches of reducing the ambiguity based on the type of a computing device from which a data access request comes and information of a household member using the computing device and stored within the memory 126 of the router 120.

Figure 4A:
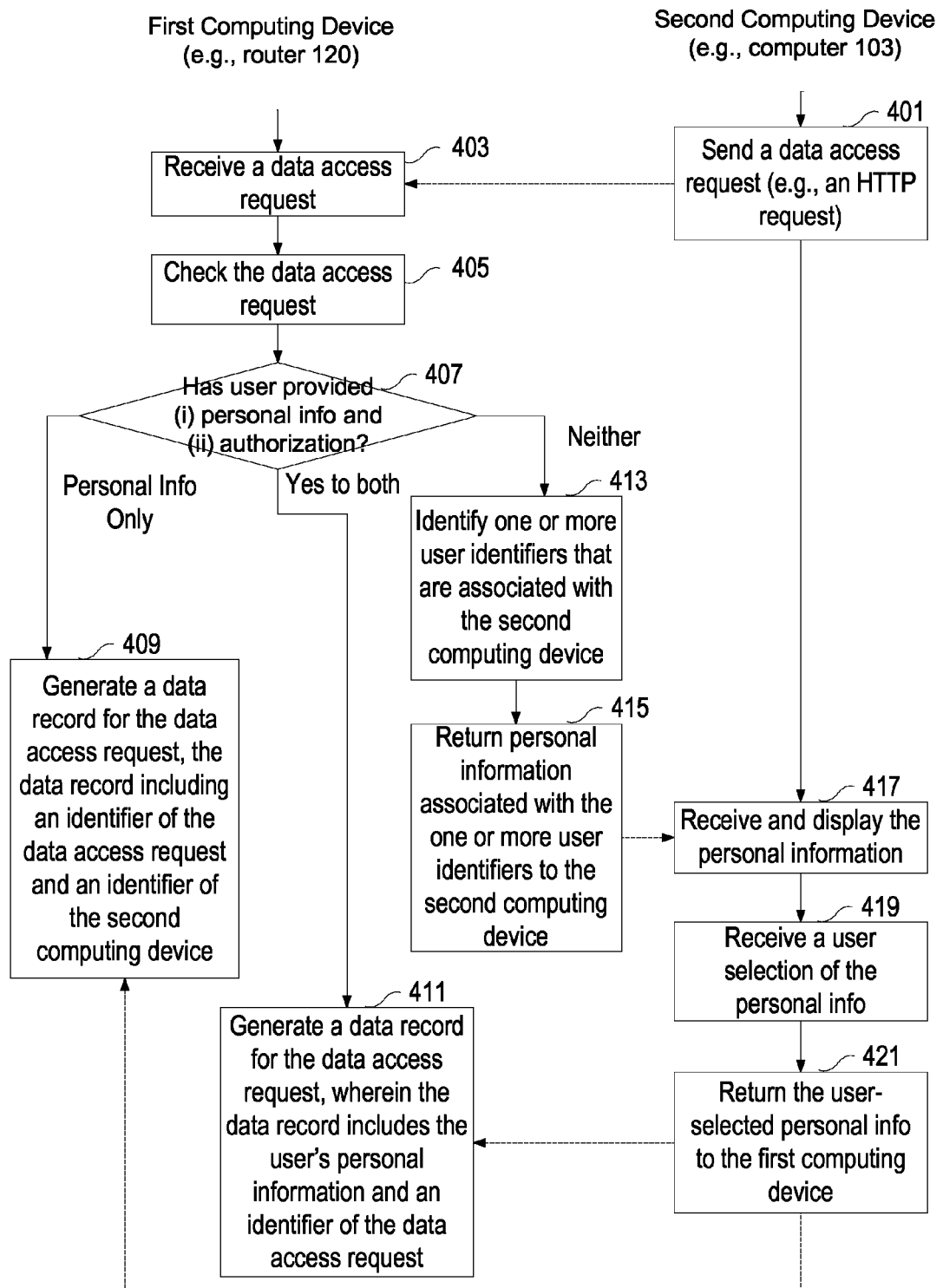
FIG. 4A is a flow chart illustrating a first interactive process performed by a first computing device and a second computing device for attempting to identify a household member responsible for a data access request received by the first computing device in accordance with some implementations.

FIG. 4A is a flow chart illustrating a first interactive process performed by a first computing device (e.g., a router 120) and a second computing device (e.g., a computer 103) for attempting to identify a household member responsible for a data access request received by the first computing device in accordance with some implementations. For example, a household member may choose to order a book from an on-line bookstore using a tablet computer. As part of the transaction, the tablet computer needs to send a data access request (e.g., an HTTP request) to a web server associated with the on-line bookstore and the first stop of the data access request is the router 120 (401).

Upon receipt of the data access request (403), the router 120 checks one or more parameters in the data access request (405) and then takes appropriate actions accordingly. For example, the router 120 extracts a device ID from the data access request that indicates which second computing device in the household the data access request comes from. In some implementations, the device ID is an IP address of the second computing device (e.g., a laptop computer). In some other implementations, the device ID is a MAC address of the second computing device (e.g., a smartphone). Using the extracted device ID, the router 120 then looks up its own memory to determine whether the user of the second computing device has provided his or her personal information as well as authorization to associate the data access request with the user's personal information (407). As described above in connection with FIG. 2, a computing device record associated with the device ID may include the user information indicating, e.g., which household member is currently using the second computing device and, if so, whether the household member has granted any authorization for the router 120 to associate the data access request with the household member.

If the router 120 determines that a household member has previously logged into his or her account and also provided authorization of having his or her web browsing activity logged under his or her name, the router 120 then generates a data record (e.g., a data access record) for the request (411), the record including at least an identifier of the data access request (which is uniquely assigned to the data access request by the router 120 or by the web traffic logging server 150), the household member's personal information (e.g., a user ID) and maybe the device ID identifying the second computing device from which the request comes.

In some implementations, the router 120 may determine that there is no user information in the device record associated with the device ID, which might happen if a household member starts browsing the web without logging into his or her account according the protocol. In this case, the router 120 may look up the user records to identify one or more user identifiers that are associated with the second computing device (413). As noted above, each household member is supposed to provide a list of computing device that he or she often uses for browsing the Internet. After identifying the user IDs associated with the second computing device from which the data access request comes, the router 120 then returns the personal information associated with the user identifiers to the second computing device (415). For example, the router 120 may return the names of the household members that have registered using the second computing device.

Upon receipt of the personal information (417), the second computing device then displays the personal information to the current user of the second computing device. As noted above, a computing device like a tablet or a smartphone may have a pre-installed application for a user of the device to log into his or her account at the router 120. Using the received personal information, the second computing device may render a list of user icons on its screen, each user icon representing one household member that has registered using this device. In response to a user selection of the one of the user icons (419), the second computing device returns the personal information associated with the user-selected user icon to the router 120 (421). The router 120 then generates a data access record accordingly as described above in connection with the step 411. By doing so, the household member currently using the second computing device may retroactively provide his or her personal information and authorization for associating the data access request with the household member.

In some implementations, the approach described above may be achieved by the router 120 exposing a predefined application programming interface (API) to the second computing device through which the second computing device can exchange data with the router 120 and instruct the router 120 to perform user-designated operations. For example, before visiting any website, a user of the second computing device may launch an application on the device and log into his or her account at the router 120 by providing his or her user name and password (if necessary) to the router 120. The application is also used by the household to update their personal information and device information stored at the router 120 as well as the web traffic logging server 150.

In some implementations, a household member using the second computing device can refuse to authorize the router 120 to associate data access requests from the second computing device with the household member after logging into his or her account. In this case, the router 120 does not generate any data access record or send anything about the household member's web browsing events to the web traffic logging server 150. In some other implementations, a household member may log into his or her account at the beginning or during the middle of a web browsing session but without notifying the router 120 whether it is authorized to log the web browsing session. In this case, the router 120 assumes that lack of authorization means a denial and therefore takes no further action of logging the web browsing session. Alternatively (as shown in FIG. 4A), the router 120 may generate a data record for the data access request (409), the data record including an identifier of the data access request, an identifier of the second computing device, and optionally a type of the second computing device, and then send the data record to the web traffic logging server 150 for further processing.

Figure 4B:
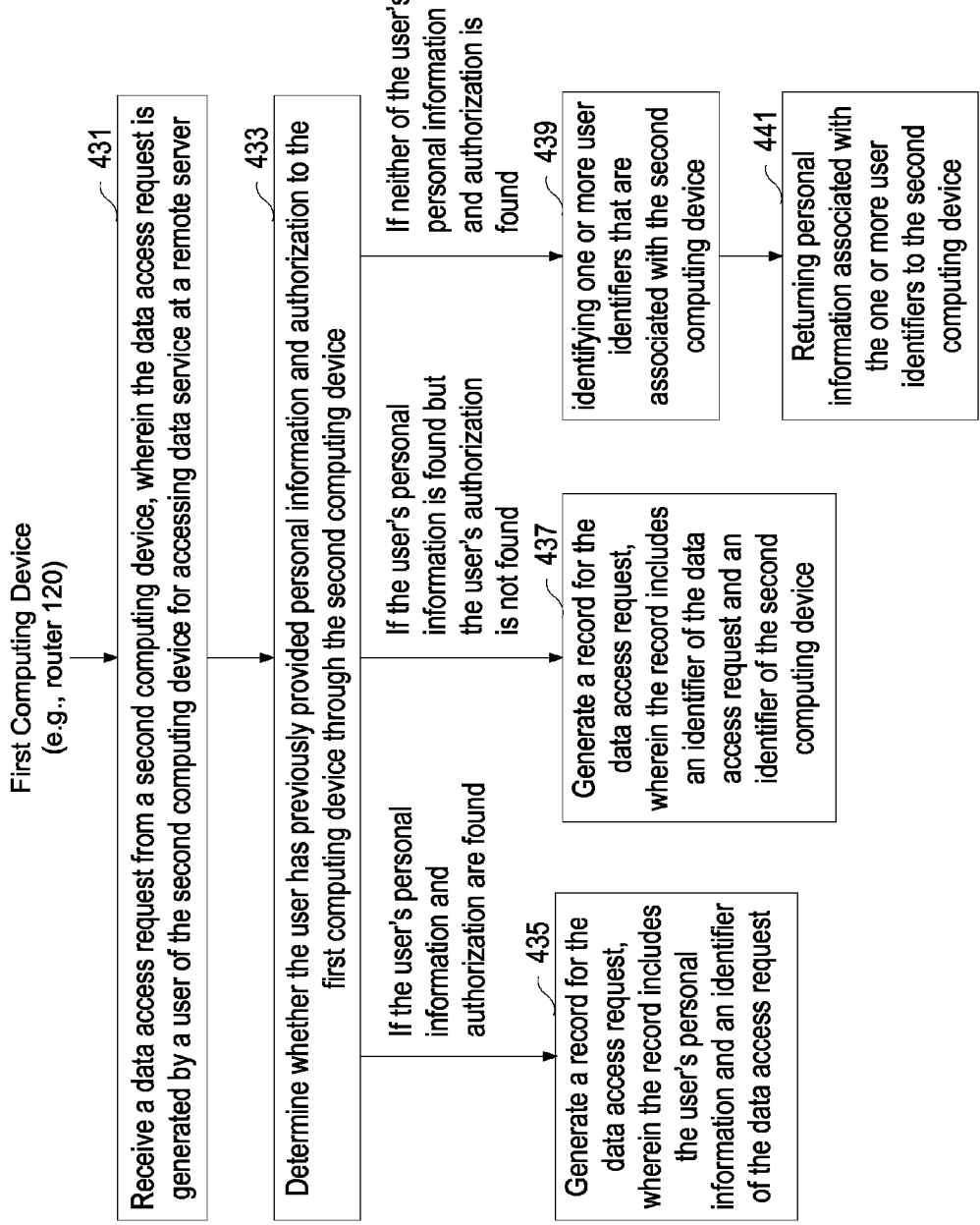
FIG. 4B is a flow chart illustrating how the first computing device processes a data access request from a second computing device in accordance with some implementations.

FIG. 4B is a flow chart further illustrating how the first computing device (e.g., the router 120) processes a data access request from a second computing device in accordance with some implementations. The first computing device first receives a data access request from a second computing device (431). The data access request is generated by a user of the second computing device for accessing data service at a remote server (e.g., a web server). In response to the data access request, the first computing device determines whether the user has previously provided personal information and authorization to the first computing device through the second computing device (433). If the user's personal information and the user's authorization are both found, the first computing device then generates a record for the data access request, the record including the user's personal information and an identifier of the data access request (435). If the user's personal information is found but the user's authorization is not found, the first computing device generates a record for the data access request, wherein the record includes an identifier of the data access request and an identifier of the second computing device (437). If neither of the user's personal information and authorization is found, the first computing device identifies one or more user identifiers that are associated with the second computing device (439) and then returns personal information associated with the one or more user identifiers to the second computing device (441). The personal information associated with the one or more user identifiers is to be displayed on the second computing device so that the user of the second computing device can choose personal information associated with one of the one or more user identifiers.

In some implementations, in order to determine whether the user has previously provided personal information and authorization to the first computing device, the first computing device extracts an identifier of the second computing device from the data access request and identifies a computing device record using the identifier of the second computing device. Next, the first computing device checks the computing device record to determine whether it includes personal information of the user of the second computing device and authorization to associate the user's personal information with the data access request.

Sometimes, a household member may use a newly-purchased computing device to browse the Internet before even registering the device and the router 120 cannot identify a computing device record using the identifier of the second computing device. In this case, the first computing device then determines a device type for the second computing device in accordance with the data access request, e.g., whether the second computing device belongs to the first group or the second group as described above. The first computing device then generates a new computing device record using the identifier of the second computing device and the determined device type. Next, the first computing device sends a registration message to the second computing device, wherein the second computing device is configured to render a graphical user interface that prompts the user of the second computing device to provide personal information and authorization to the graphical user interface and forward the user-provided personal information and authorization to the first computing device. Finally, the first computing device updates the new computing device record using the user-provided personal information and authorization.

Figure 5A:
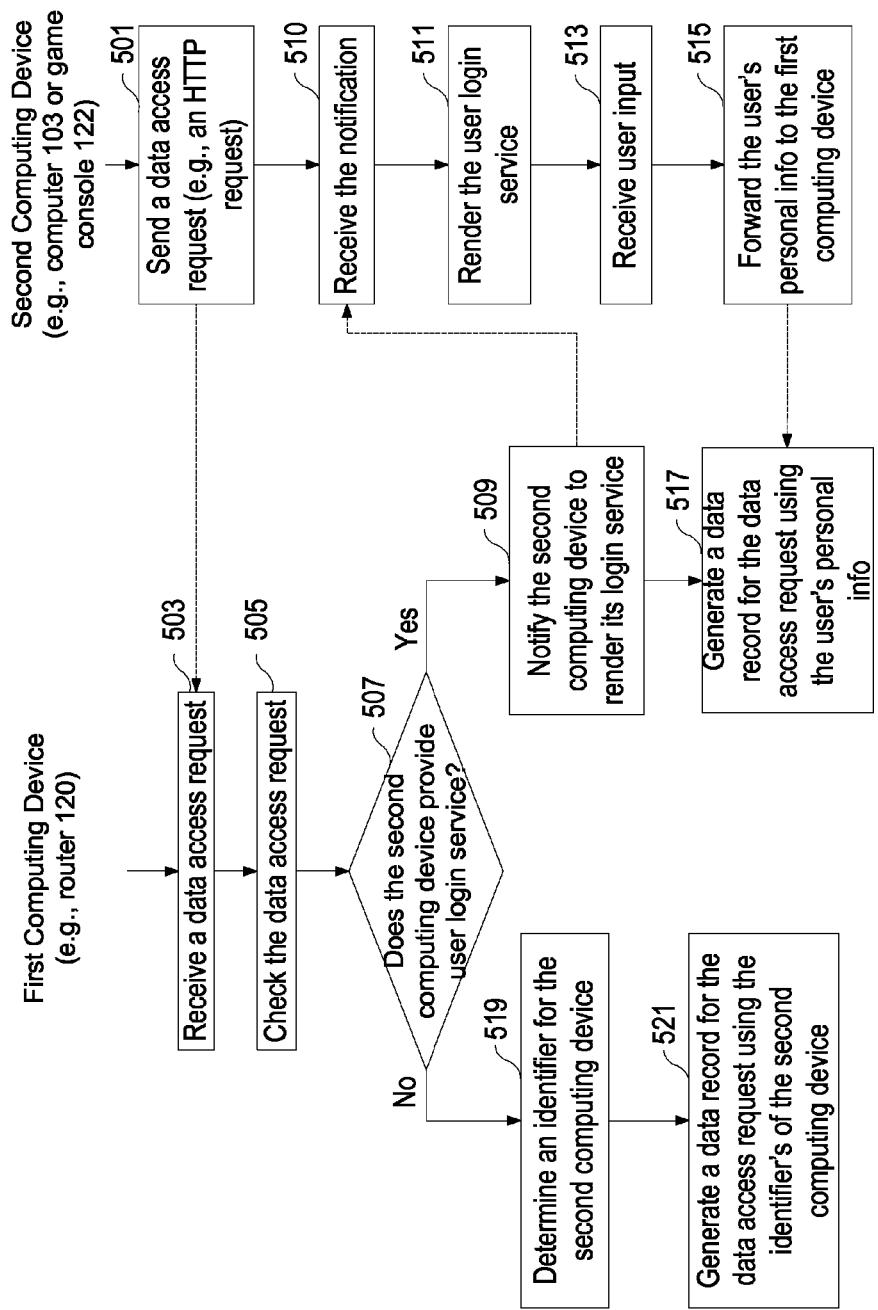
FIG. 5A is a flow chart illustrating a second interactive process performed by a first computing device and a second computing device for attempting to identify a household member responsible for a data access request received by the first computing device in accordance with some implementations.

FIG. 5A is a flow chart illustrating a second interactive process performed by a first computing device (e.g., the router 120) and a second computing device for attempting to identify a household member responsible for a data access request received by the first computing device in accordance with some implementations. Note that the second computing device may be a computer 103 that provides a user login service through which the household member can log into his or her account at the router 120 or a game console 122 that may not have the user login service associated with the router 120.

Upon receipt of the data access request (503), the router 120 checks one or more parameters in the data access request (505) and then takes appropriate actions accordingly. For example, the router 120 extracts a device ID from the data access request and then identifies a device record associated with the device ID. If there is no personal information or authorization associated with the second computing device, the router 120 cannot associate the data access request with a particular household member. However, the router 120 can determine whether the second computing device provides a user login service or not based on the information in the device record (507). For example, as noted above in connection with FIG. 1, some devices like the computer 103 and the smartphone 124 can provide a user login service associated with the router 120 whereas other devices like the smart TV 117 and the game console 122 may not.

If the router 120 finds out that the second computing device provides the user login service (507—yes), the router 120 then notifies the second computing device to render its login service on its screen (509). Upon receipt of the notification (510), the second computing device then renders the user login service by displaying the personal information of the household members to the current user of the second computing device. For example, the personal information may be rendered in the form of a list of user icons on its screen, each user icon representing one household member that has registered using this device. In response to a user input by, e.g., selecting one of the user icons (513), the second computing device returns the personal information associated with the user-selected user icon to the router 120 (515). The router 120 then generates a data access record accordingly as described above in connection with the step 411. But if the router 120 finds out that the second computing device does not provide the user login service (507—no), e.g., if the data access request is from the game console 122, the router 120 determines an identifier for the second computing device (519) and generate a data record for the data access request (521). For example, the data record may include an identifier of the data access request, an identifier of the second computing device, and optionally a type of the second computing device, which may be processed by the web traffic logging server 150 subsequently. In some implementations, the router 120 performs the operations associated with the steps 519 and 521 only if there is a prior approval from the household (e.g., when the household signs the agreement with the agency that manages the web traffic logging server 150).

Figure 5B:
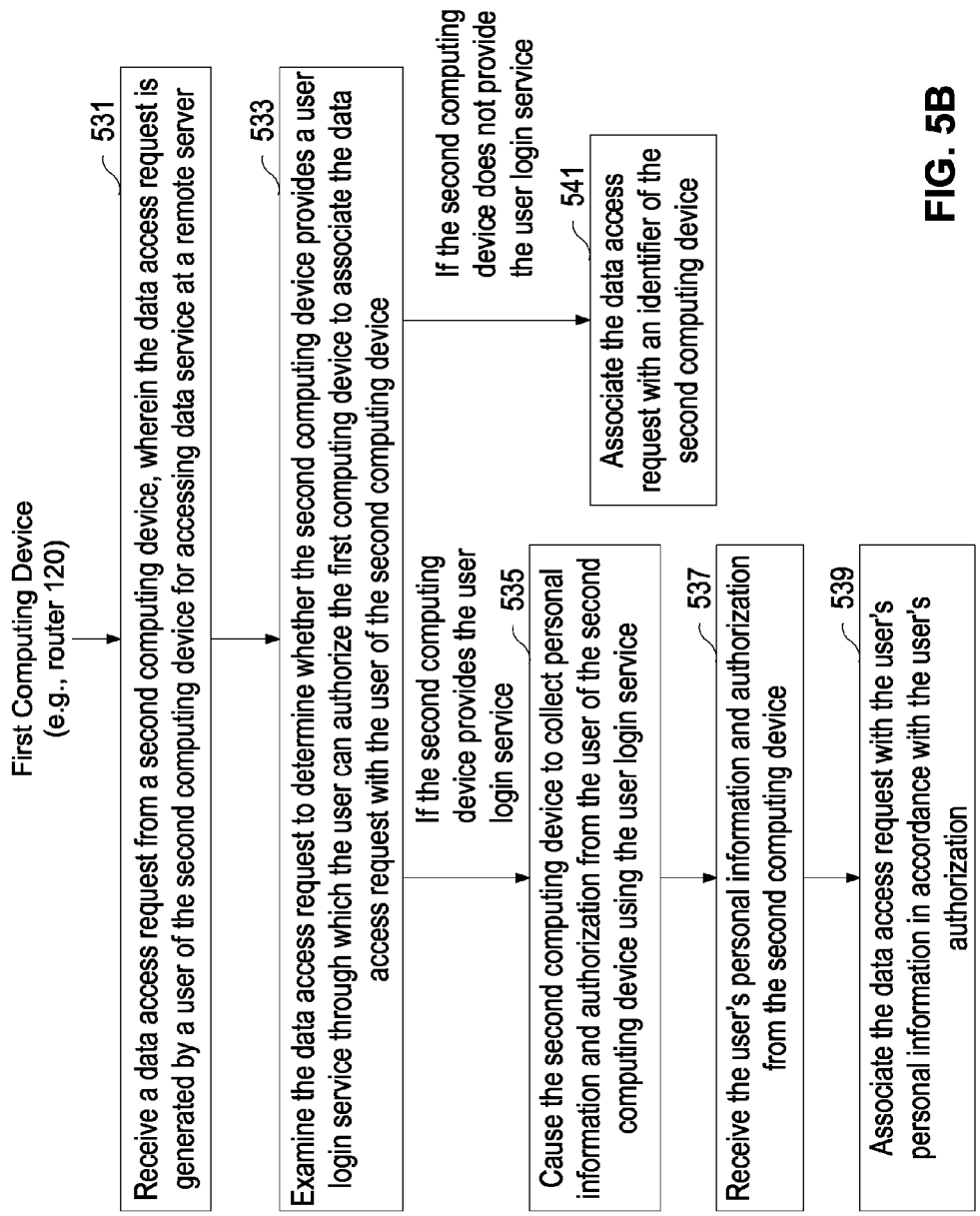
FIG. 5B is a flow chart illustrating how the first computing device processes a data access request from a second computing device in accordance with some implementations.

FIG. 5B is a flow chart illustrating how the first computing device processes a data access request from a second computing device in accordance with some implementations. The first computing device first receives a data access request from a second computing device (531). The data access request is generated by a user of the second computing device for accessing data service at a remote server (e.g., a web server). In response to the data access request, the first computing device examines the data access request to determine whether the second computing device provides a user login service through which the user can authorize the first computing device to associate the data access request with the user of the second computing device (533). If the second computing device provides the user login service, the first computing device then causes the second computing device to collect personal information and authorization from the user of the second computing device using the user login service (535). Upon receipt of the user's personal information and authorization from the second computing device (537), the first computing device generates a data record by associating the data access request with the user's personal information in accordance with the user's authorization (539). If the second computing device does not provide the user login service, the first computing device then generates a data record by associating the data access request with an identifier of the second computing device (541).

In some implementations, in order to examine the data access request, the first computing device extracts an identifier of the second computing device from the data access request and identifies a computing device record using the identifier of the second computing device. Next, the first computing device checks a device type of the computing device record to determine whether the second computing device provides the user login service. For a computing device that has no corresponding device record, the first computing device then determines a device type for the second computing device in accordance with the data access request, e.g., whether the second computing device belongs to the first group or the second group as described above. The first computing device then generates a new computing device record using the identifier of the second computing device and the determined device type. If the second computing device has one of a plurality of predefined device types (e.g., a computer or a smartphone), the first computing device sends a registration message to the second computing device. In response, the second computing device renders a graphical user interface that prompts the user of the second computing device to provide personal information and authorization to the graphical user interface and then forwards the user-provided personal information and authorization to the first computing device. The first computing device then updates the new computing device record using the user-provided personal information and authorization. But if the second computing device does not has any of the plurality of predefined device types (e.g., the second computing device is a smart TV or a game console), the first computing device then updates the new computing device record using the identifier of the second computing device.

Figure 6A:
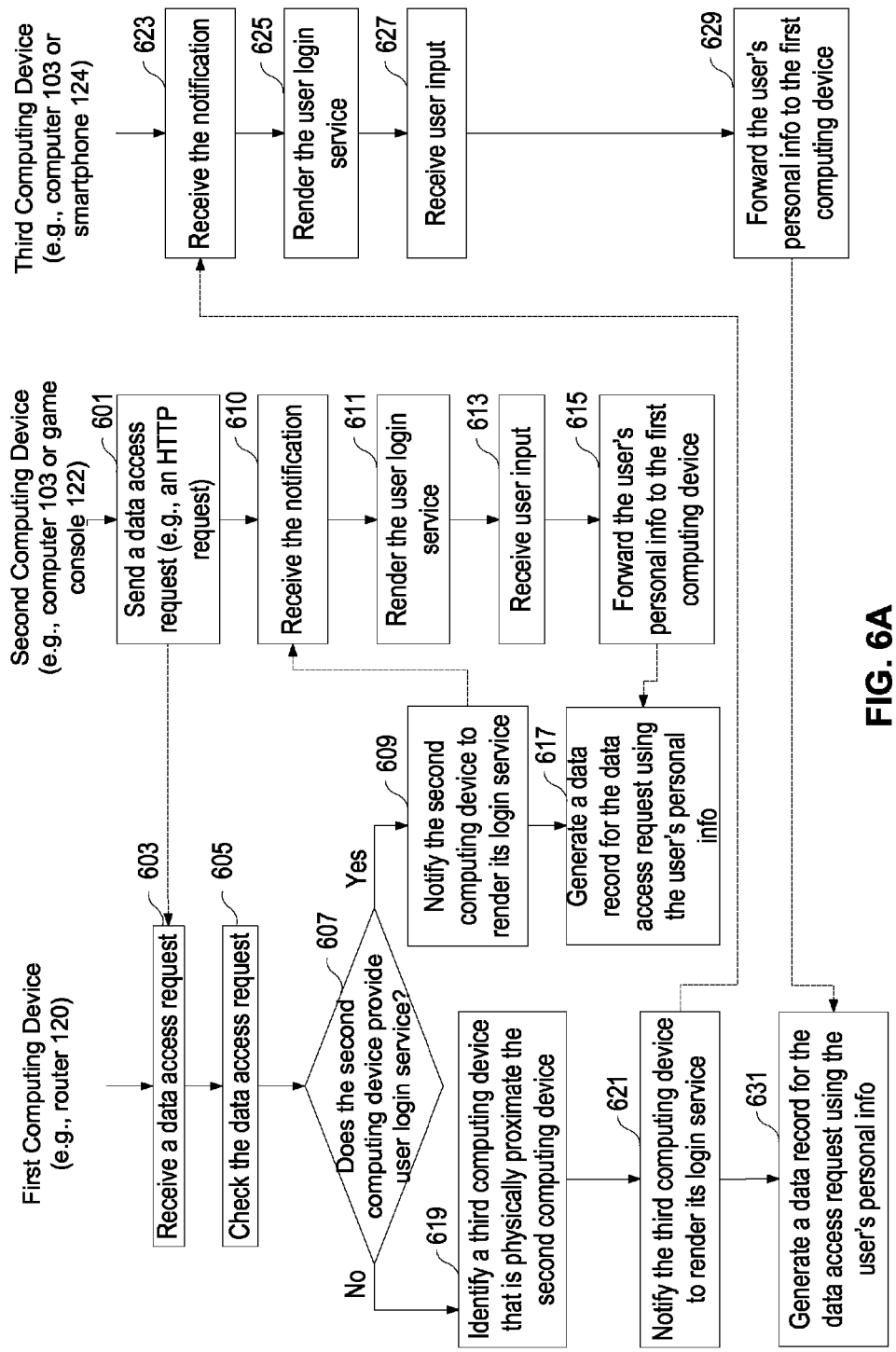
FIG. 6A is a flow chart illustrating a third interactive process performed by a first computing device, a second computing device, and a third computing device for attempting to identify a household member responsible for a data access request received by the first computing device in accordance with some implementations.

FIG. 6A is a flow chart illustrating a third interactive process performed by a first computing device (e.g., a router 120), a second computing device (e.g., a computer 103 or a game console 122), and a third computing device (e.g., a computer 103 or a smartphone 124) for attempting to identify a household member responsible for a data access request received by the first computing device in accordance with some implementations. In other words, the second computing device may or may not be able to provide a user login service whereas the third computing device can provide a user login service.

Upon receipt of the data access request (603), the router 120 checks one or more parameters in the data access request (605) and then takes appropriate actions accordingly. For example, the router 120 extracts a device ID from the data access request and then identifies a device record associated with the device ID. If there is no personal information or authorization associated with the second computing device, the router 120 cannot associate the data access request with a particular household member. However, the router 120 can determine whether the second computing device provides a user login service or not based on the information in the device record (607).

If the router 120 finds out that the second computing device provides the user login service (607—yes), the router 120 then notifies the second computing device to render its login service on its screen (609). Upon receipt of the notification (610), the second computing device then renders the user login service by displaying the personal information of the household members to the current user of the second computing device. For example, the personal information may be rendered in the form of a list of user icons on its screen, each user icon representing one household member that has registered using this device. In response to a user input by, e.g., selecting one of the user icons (613), the second computing device returns the personal information associated with the user-selected user icon to the router 120 (615). The router 120 then generates a data access record accordingly as described above in connection with the step 411.

But if the router 120 finds out that the second computing device does not provide the user login service (607—no), e.g., if the data access request is from the game console 122, the router 120 then identifies a third computing device that is physically proximate the second computing device (619). As described above in connection with FIG. 2, the router 120 may store the location information of the computing devices. In some implementations, a computing device (e.g., a tablet or a smartphone) may update its location information using the API offered by the router 120. In this case, if the router 120 finds out that the data access request is from a game console located in the family room and that there is a smartphone currently located in the same room, the router 120 may identify this smartphone as the third computing device and notifies the smartphone to render its user login service (621).

Upon receipt of the notification (623), the third computing device then renders the user login service by displaying the personal information of the household members to the current user of the second computing device. For example, the personal information may be rendered in the form of a list of user icons on its screen, each user icon representing one household member that has registered using this device. In response to a user input by, e.g., selecting one of the user icons (627), the third computing device returns the personal information associated with the user-selected user icon to the router 120 (629). The router 120 then generates a data access record accordingly by associating the data access request with the user's personal information provided by the third computing device (631).

Figure 6B:
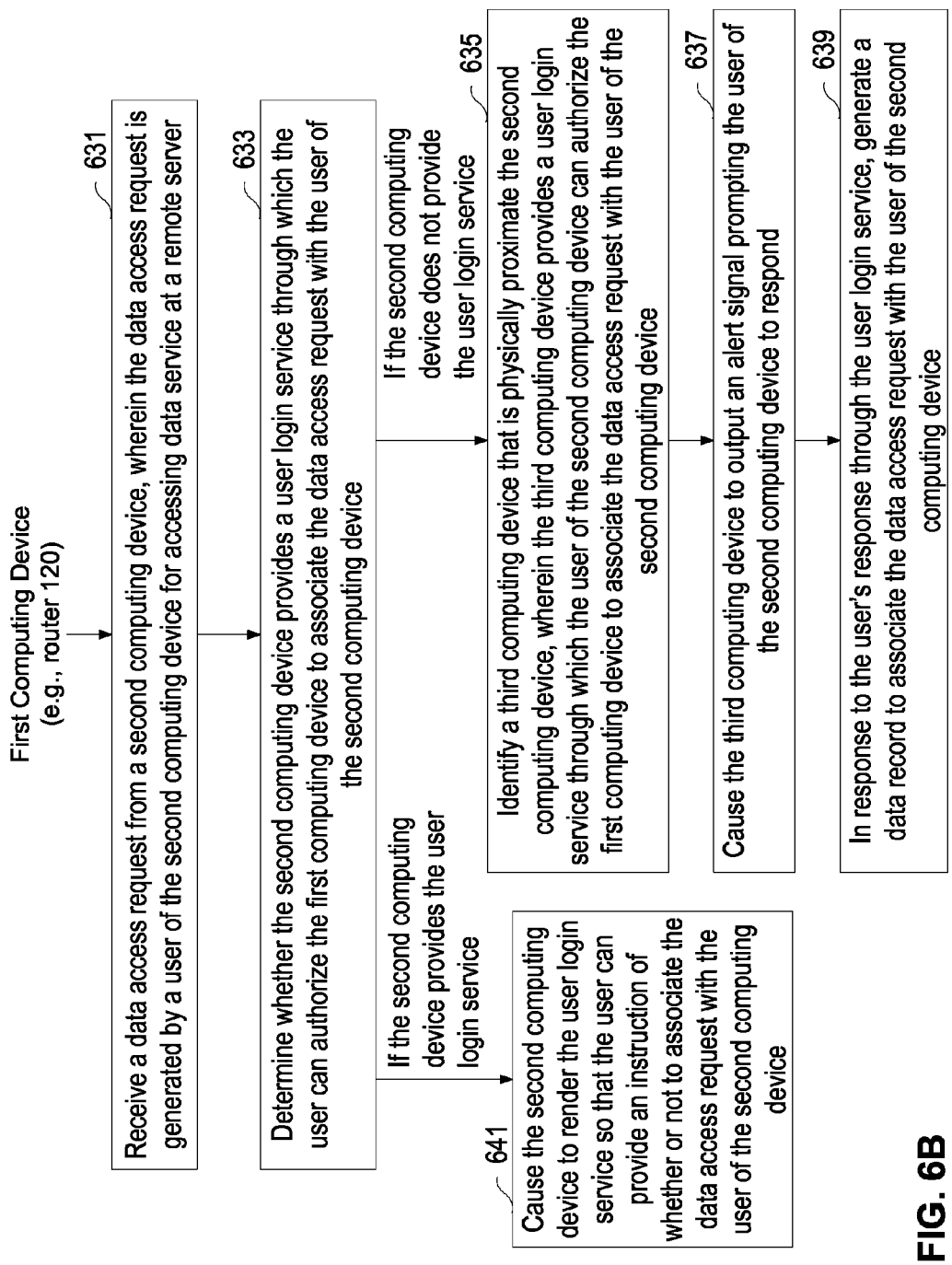
FIG. 6B is a flow chart illustrating how the first computing device processes a data access request from a second computing device in accordance with some implementations.

FIG. 6B is a flow chart illustrating how the first computing device processes a data access request from a second computing device in accordance with some implementations. The first computing device first receives a data access request from a second computing device (631). The data access request is generated by a user of the second computing device for accessing data service at a remote server (e.g., a web server). In response to the data access request, the first computing device determines whether the second computing device provides a user login service through which the user can authorize the first computing device to associate the data access request with the user of the second computing device (633). If the second computing device provides the user login service, the first computing device then causes the second computing device to render the user login service so that the user can provide an instruction of whether or not to associate the data access request with the user of the second computing device (641). Upon receipt of the user's personal information and authorization from the second computing device, the first computing device generates a data record by associating the data access request with the user's personal information in accordance with the user's authorization. If the second computing device does not provide the user login service, the first computing device then identifies a third computing device that is physically proximate the second computing device (635). In some implementations, the third computing device provides a user login service through which the user of the second computing device can authorize the first computing device to associate the data access request with the user of the second computing device or any other computing devices within the household. The first computing device then causes the third computing device to output an audio or visual alert signal prompting the user of the second computing device to respond (637). For example, if the third computing device is a smartphone, it may generate a predefined ringtone or flash its screen in a predefined manner to get the household members' attention. A user of the second computing device who notices the alert signal then provides instructions of whether or not to associate the data access request with the user through the user login service provided by the third computing device. In response to the user instructions, the first computing device generates a data record accordingly (639).

In some implementations, in order to determine whether the second computing device provides a user login service, the first computing device extracts an identifier of the second computing device from the data access request and identifies a computing device record using the identifier of the second computing device. Next, the first computing device checks a device type of the computing device record to determine whether the second computing device provides the user login service. For a new computing device that has no corresponding device record, the first computing device determines a device type for the second computing device in accordance with the data access request, e.g., whether the second computing device belongs to the first group or the second group as described above. The first computing device then generates a new computing device record using the identifier of the second computing device and the determined device type. If the second computing device has one of a plurality of predefined device types (e.g., a computer or a smartphone), the first computing device sends a registration message to the second computing device. In response, the second computing device renders a graphical user interface that prompts the user of the second computing device to provide personal information and authorization to the graphical user interface and then forwards the user-provided personal information and authorization to the first computing device. The first computing device then updates the new computing device record using the user-provided personal information and authorization. But if the second computing device does not has any of the plurality of predefined device types (e.g., the second computing device is a smart TV or a game console), the first computing device selects one computing device record among a plurality of computing device records that has been identified as being physically proximate the second computing device and also providing the user login service. Next, the first computing device sends an alert message to the third computing device. The third computing device, in response, outputs the alert signal prompting the user of the second computing device to respond by rendering a graphical user interface that prompts the user of the second computing device to provide personal information and authorization to the graphical user interface and then forwards the user-provided personal information and authorization to the first computing device. The first computing device then generates a data record for the data access request, the record including the user-provided personal information and the identifier of the data access request.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method, comprising:
    at a first computing device having memory and one or more processors, wherein the memory stores user information for a plurality of users:
        receiving a data access request from a second computing device, wherein the data access request is generated by a user of the second computing device for accessing data service at a remote server;
        determining whether the user has previously provided personal information and authorization to the first computing device through the second computing device, wherein the authorization comprises authorization for the first computing device to store an association between the user and the user's data access requests;
        when it is determined that the user has previously provided personal information and authorization to the first computing device through the second computing device:
            generating a record for the data access request, wherein the record includes the user's personal information and an identifier of the data access request;
        when it is determined that the user has previously provided personal information but not provided authorization to the first computing device through the second computing device:
            generating a record for the data access request, wherein the record includes an identifier of the data access request and an identifier of the second computing device; and
        when it is determined that the user has not previously provided personal information and not provided authorization to the first computing device through the second computing device:
            identifying one or more user identifiers that are associated with the second computing device; and
            returning personal information associated with the one or more user identifiers to the second computing device, wherein the personal information associated with the one or more user identifiers is to be displayed on the second computing device so that the user of the second computing device can choose personal information associated with one of the one or more user identifiers.

2. The computer-implemented method of claim 1, wherein the user's personal information includes an identifier of the user and one or more identifiers of computing devices that are available to the user for accessing data services.

3. The computer-implemented method of claim 1, wherein the identifier of the second computing device is one of an IP address and a MAC address.

4. The computer-implemented method of claim 1, wherein the first computing device and the second computing device are located within one household such that the first computing device is configured to process data access requests from the second computing device to respective web servers.

5. The computer-implemented method of claim 1, wherein the first computing device is a network router.

6. The computer-implemented method of claim 1, wherein the second computing device is one selected from the group consisting of a personal computer, a tablet computer, and a smart phone.

7. The computer-implemented method of claim 1, wherein the data access request is an HTTP request to a web server.

8. The computer-implemented method of claim 1, wherein determining whether the user has previously provided personal information and authorization to the first computing device further includes:
    extracting an identifier of the second computing device from the data access request;
    identifying a computing device record using the identifier of the second computing device; and
    checking the computing device record to determine whether it includes personal information of the user of the second computing device and authorization to associate the user's personal information with the data access request.

9. The computer-implemented method of claim 8, further comprising:
    if no computing device record is identified using the identifier of the second computing device:
        determining a device type for the second computing device in accordance with the data access request;
        generating a new computing device record using the identifier of the second computing device and the determined device type;
        sending a registration message to the second computing device, wherein the second computing device is configured to render a graphical user interface that prompts the user of the second computing device to provide personal information and authorization to the graphical user interface and forward the user-provided personal information and authorization to the first computing device; and
        updating the new computing device record using the user-provided personal information and authorization.

10. The computer-implemented method of claim 8, wherein the first computing device is configured to associate the data access request with the identifier of the second computing device if the computing device record provides no indication of whether the user of the second computing device is allowed to associate the data access request with the user's personal information.

11. The computer-implemented method of claim 8, wherein the first computing device is configured to skip the data access request if the computing device record indicates that the user of the second computing device does not allow the association of the data access request with the user's personal information.

12. A first computing device, comprising:
    one or more processors;
    memory; and
    one or more program modules stored in the memory, wherein the one or more program modules include instructions to be executed by the one or more processors, and wherein the memory stores user information for a plurality of users, the program modules including instructions for:
        receiving a data access request from a second computing device, wherein the data access request is generated by a user of the second computing device for accessing data service at a remote server;
        determining whether the user has previously provided personal information and authorization to the first computing device through the second computing device, wherein the authorization comprises authorization for the first computing device to store an association between the user and the user's data access requests;

when it is determined that the user has previously provided personal information and authorization to the first computing device through the second computing device:
  generating a record for the data access request, wherein the record includes the user's personal information and an identifier of the data access request;

when it is determined that the user has previously provided personal information but not provided authorization to the first computing device through the second computing device:
  generating a record for the data access request, wherein the record includes an identifier of the data access request and an identifier of the second computing device; and when it is determined that the user has not previously provided personal information and not provided authorization to the first computing device through the second computing device:
  identifying one or more user identifiers that are associated with the second computing device; and
  returning personal information associated with the one or more user identifiers to the second computing device, wherein the personal information associated with the one or more user identifiers is to be displayed on the second computing device so that the user of the second computing device can choose personal information associated with one of the one or more user identifiers.

13. The first computing device of claim 12, wherein the first computing device is a network router.

14. The first computing device of claim 12, wherein the second computing device is one selected from the group consisting of a personal computer, a tablet computer, and a smart phone.

15. The first computing device of claim 12, wherein the instructions for determining whether the user has previously provided personal information and authorization to the first computing device further include instructions for:
  extracting an identifier of the second computing device from the data access request;
  identifying a computing device record using the identifier of the second computing device; and
  checking the computing device record to determine whether it includes personal information of the user of the second computing device and authorization to associate the user's personal information with the data access request.

16. The first computing device of claim 15, wherein the instructions for determining whether the user has previously provided personal information and authorization to the first computing device further include instructions for:
  if no computing device record is identified using the identifier of the second computing device:
    determining a device type for the second computing device in accordance with the data access request;
    generating a new computing device record using the identifier of the second computing device and the determined device type;
    sending a registration message to the second computing device, wherein the second computing device is configured to render a graphical user interface that prompts the user of the second computing device to provide personal information and authorization to the graphical user interface and forward the user-provided personal information and authorization to the first computing device; and
    updating the new computing device record using the user-provided personal information and authorization.

17. The first computing device of claim 15, wherein the first computing device is configured to associate the data access request with the identifier of the second computing device if the computing device record provides no indication of whether the user of the second computing device is allowed to associate the data access request with the user's personal information.

18. The first computing device of claim 15, wherein the first computing device is configured to skip the data access request if the computing device record indicates that the user of the second computing device does not allow the association of the data access request with the user's personal information.

19. A non-transitory computer readable storage medium storing one or more programs configured for execution by a first computing device that includes one or more processors and memory storing one or more programs, wherein the memory stores user information for a plurality of users, the one or more programs comprising instructions for:
  receiving a data access request from a second computing device, wherein the data access request is generated by a user of the second computing device for accessing data service at a remote server;
  determining whether the user has previously provided personal information and authorization to the first computing device through the second computing device, wherein the authorization comprises authorization for the first computing device to store an association between the user and the user's data access requests;
  when it is determined that the user has previously provided personal information and authorization to the first computing device through the second computing device:
    generating a record for the data access request, wherein the record includes the user's personal information and an identifier of the data access request;
  when it is determined that the user has previously provided personal information but not provided authorization to the first computing device through the second computing device:
    generating a record for the data access request, wherein the record includes an identifier of the data access request and an identifier of the second computing device; and
  when it is determined that the user has not previously provided personal information and not provided authorization to the first computing device through the second computing device:
    identifying one or more user identifiers that are associated with the second computing device; and
    returning personal information associated with the one or more user identifiers to the second computing device, wherein the personal information associated with the one or more user identifiers is to be displayed on the second computing device so that the user of the second computing device can choose personal information associated with one of the one or more user identifiers.

20. The non-transitory computer readable storage medium of claim 19, wherein the first computing device is a network router.

* * * * *